Figure 1:
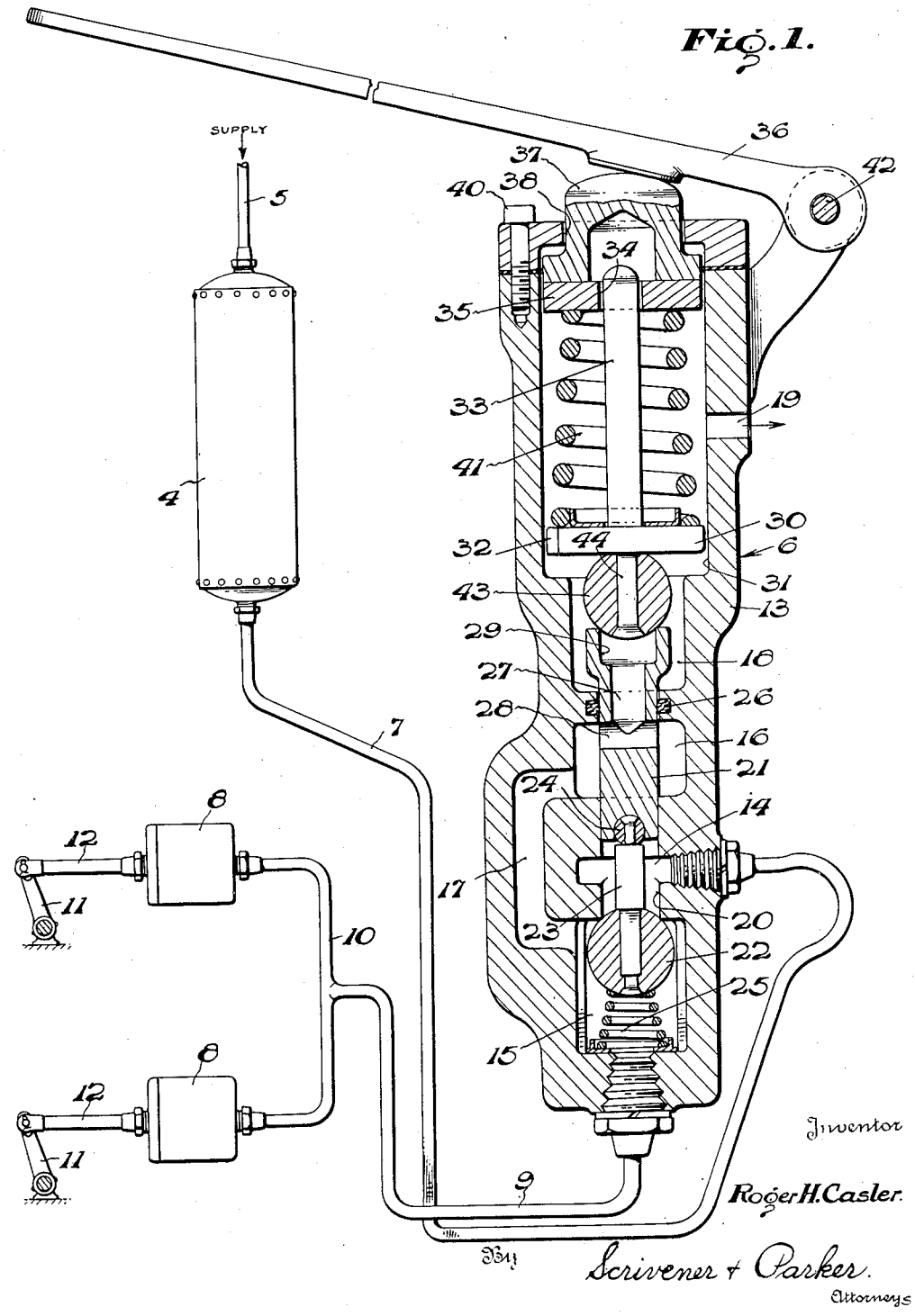

Jan. 3, 1950 R. H. CASLER 2,493,442
VALVE MECHANISM
Filed Sept. 18, 1946 2 Sheets-Sheet 2

Inventor
Roger H. Casler.
By Scrivener + Parker.
Attorneys

Patented Jan. 3, 1950

2,493,442

UNITED STATES PATENT OFFICE 2,493,442

VALVE MECHANISM

Roger H. Casler, Oakville, Conn., assignor to Bendix-Westinghouse Automotive Air Brake Company, Elyria, Ohio, a corporation of Delaware Application September 18, 1946, Serial No. 697,755

13 Claims. (Cl. 303—54)

This invention relates to fluid pressure control mechanism, and more particularly to valve mechanism for controlling the supply of fluid pressure to the actuators of such a system.

It has previously been proposed to provide valve mechanisms of the self-lapping type for accurately controlling the pressure of fluid supplied to the actuators of a fluid pressure control system, but many of these valve mechanisms have required the use of relatively large pressure responsive members for controlling the operation of the valves in the valve mechanism, with the result that the valve mechanism has been relatively large, and with the further result that the operator has been required to exert an unduly large force on the operating element in order to control the action of the valve mechanism. It is accordingly an object of the present invention to provide valve mechanism of the self-lapping type so constituted as to eliminate the use of relatively large pressure responsive control members, and at the same time to materially reduce the over-all size of the valve mechanism.

Another object of the invention is to provide, in control valve mechanisms of the above type, means for controlling the operation of the valves, so constituted as to minimize or materially reduce the force required to operate the valve mechanism.

A further object of the invention is to provide means for balancing or partially balancing the valves of the mechanism, in order to reduce the force required to control the mechanism.

Still another object of the invention is to provide simple and efficient self-lapping control valve mechanism, so constituted as to accurately control the supply of fluid pressure to the actuators of a fluid pressure control system.

Another object of the invention is to provide means for permitting alignment of the valves with their respective seats in order to minimize leakage when the valves are closed.

Other objects and features of novelty will appear more fully from the following detailed description when taken in connection with the accompanying drawings wherein two embodiments of the invention are illustrated. It is to be expressly understood, however, that the drawings are employed for purposes of illustration only, and are not designed as a definition of the limits of the invention, reference being had for this purpose to the appended claims.

Figure 2:
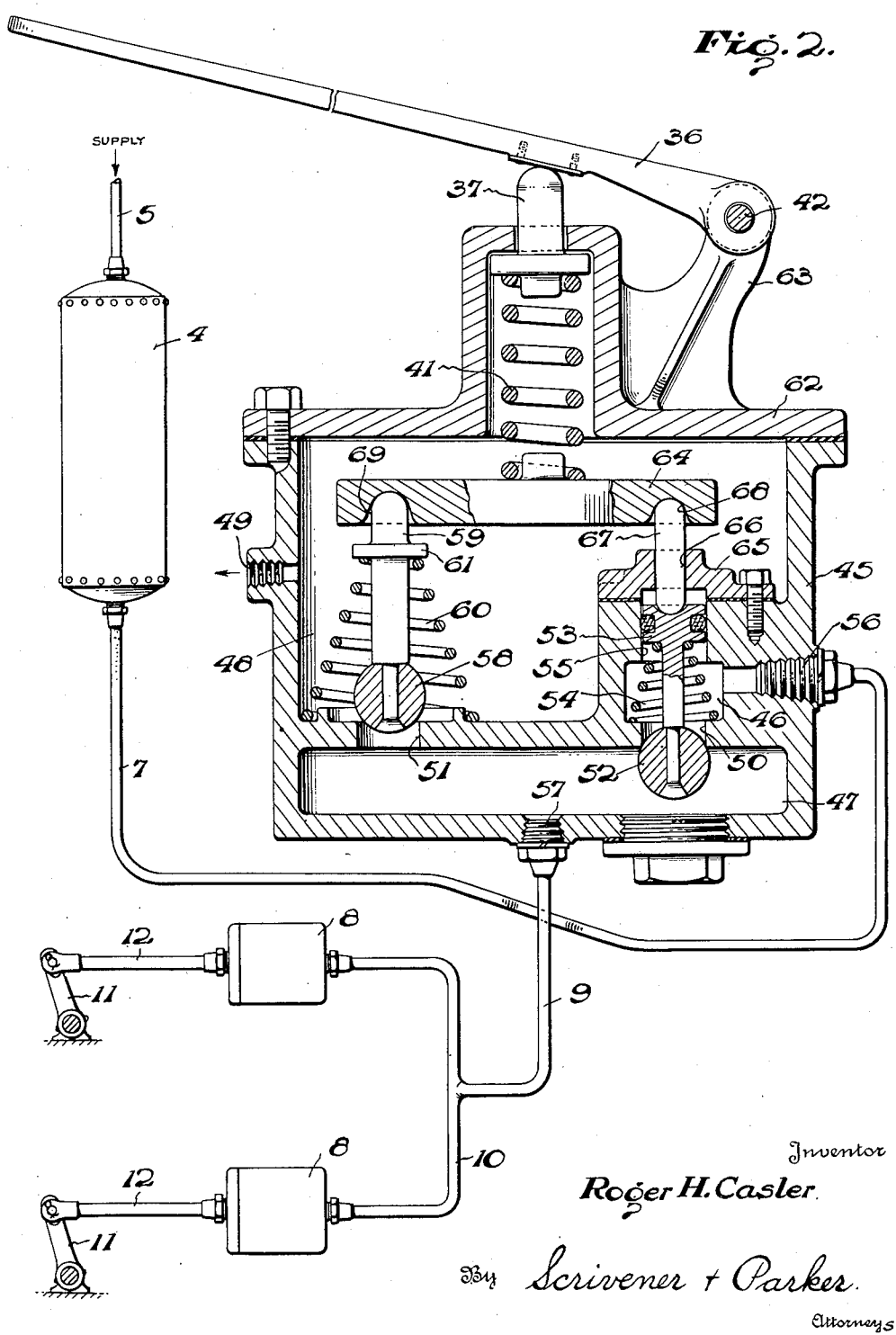

In the drawings, wherein similar reference characters refer to similar parts throughout the several views:

Fig. 1 is a view, partially in section, showing a fluid pressure control system having a control valve mechanism of the above type, and Fig. 2 is a view, partially in section, of a fluid pressure control system provided with a modified form of valve mechanism.

Referring to Fig. 1 of the drawings, a fluid pressure control system is shown as comprising a reservoir 4 adapted to receive a fluid pressure from a compressor, not shown, through a conduit 5, a self-lapping control valve mechanism 6 adapted to receive fluid pressure from the reservoir through a conduit 7, a pair of fluid actuators 8 adapted to receive fluid pressure from the control valve mechanism through conduits 9 and 10, and a pair of operating levers 11 adapted to be actuated through rods 12.

As shown in the drawing, the valve mechanism 6 is provided with a casing 13 having an inlet chamber 14 connected with the conduit 7, an outlet chamber 15 having a chamber 16 connected thereto at all times by means of a passage 17 formed in the casing, and an exhaust chamber 18 having an atmospheric or exhaust port 19. A bore 20, preferably of uniform cross section, is formed in the casing as shown, and serves to connect all of the above referred to chambers. A valve operating element 21 is slidably mounted in the bore as shown, and is connected at its lower end with a spherical inlet valve 22 by means of a stem 23 connected to the lower end of the element 21 by means of a ball and socket joint 24, the construction of the joint being such that the valve moves with the valve operating element axially, but is free to move laterally in order to permit the ball to seat properly on the lower end of the bore 20. The inlet valve and valve operating element are normally maintained in the position shown by means of an inlet valve spring 25 interposed between the casing and the inlet valve. Since the chamber 16 is connected with the outlet chamber 15 by means of the passage 17, a seal 26 is provided in the bore 20 directly above the chamber 16 in order to prevent leakage from the chamber 16 to the exhaust chamber 18 by the valve operating element 21. The upper end of the valve operating element is provided with a bore 27 connected with the chamber 16 by means of ports 28, and connected at its upper end with an enlarged bore 29 which is preferably of substantially the same diameter as the bore 20. A valve operating plunger 30 is slidably mounted in a bore 31 formed in the upper portion of the casing, the outer periphery of the plunger being provided with notches 32 in order to permit unrestricted flow of fluid pressure from the lower portion of the exhaust chamber to the upper portion, and thence to the exhaust port 19. The plunger is provided with an upwardly extending stem 33 guided at its upper end in a bore 34 formed in a washer 35 slidably mounted in the upper portion of the bore 31, and adapted to be moved downwardly by means of a control lever 36 having an operative connection therewith through the medium of a plunger 37 slidably mounted in a bore 38 formed in a cover plate 39 attached to the upper portion of the housing by means of suitable cap screws 40. A graduating spring 41 is interposed between the washer 35 and the plunger 30, and it will be understood that on downward movement of the lever 36, which is pivotally connected with the casing by means of a pivot pin 42, the graduating spring will be compressed, and a spherical exhaust valve 43, mounted on a stem 44, extending downwardly from the plunger 30, will be forced against the upper end of the bore 29 in order to prevent communication between the outlet chamber 15 and the exhaust chamber 18 through passage 17, chamber 16, ports 28, and bores 27 and 29. In order to permit alignment of the exhaust valve with its seat, the plunger 30 is loosely fitted in the bore 31.

As heretofore stated, the diameter of the bore 20 is preferably uniform, and it will therefore be understood that the effective area of the inlet valve 22 is substantially identical with the area of the valve operating element which is subjected at its upper end to the pressure in the chamber 16. Thus with the parts in the position shown, the force exerted by the fluid pressure in the inlet chamber 14 to move the inlet valve toward open position is identical with the force exerted on the element 21 in the opposite direction to maintain the inlet valve in closed position. These forces are therefore balanced when there is no pressure in the outlet chamber, and the inlet valve is maintained in closed position by the force exerted by the spring 25. In this particular embodiment of the invention, the exhaust valve 43 may be normally maintained in closed position by gravity with a relatively small force, and on counterclockwise movement of the control lever 36, the graduating spring 41 will be compressed, and the valve operating element will be moved downward to open the inlet valve in order to connect the inlet chamber 14 with the outlet chamber 15, and with the chamber 16 through the port 17. Since the upper end of the bore 29 is closed by the exhaust valve under this condition of operation, the valve operating element 21 will act as a piston, and the pressure differential between chambers 14 and 15 and between chambers 16 and 18, will tend to force the element upward against the force exerted by the graduating spring 41 to close the inlet valve. At the same time, the pressure differential between chambers 14 and 15 will tend to force the spherical inlet valve 22 toward closed position as the pressure in chamber 15 increases. As the pressure increases in the chamber 16, the upward force on the element will correspondingly increase, and the inlet valve will be closed when the pressure in the passage 17 and in the chamber 16 reaches a predetermined value dependent on the degree of downward force exerted by the graduating spring. In the event the pressure in the chamber 16 increases beyond a predetermined value, due to leakage of the inlet valve, the valve 43 will be moved upward from its seat in order to discharge the excess pressure to atmosphere through the exhaust port 19. On release movement of the control pedal in a clockwise direction, the tension of the graduating spring will be decreased, and the pressure acting on the lower end of the exhaust valve in the bore 29 will move the valve away from its seat in order to permit the exhaust of fluid pressure from the chamber 15 through passage 17, chamber 16, ports 28, bore 27, bore 29, exhaust chamber 18 and exhaust port 19, the degree of fluid pressure released in this manner being dependent on the degree of release movement of the control pedal. On complete release of the control pedal, the pressure acting on the lower end of the exhaust valve need only overcome the weight of the parts associated therewith, and consequently the pressure in chamber 16 will be substantially reduced to atmospheric pressure.

It will be apparent from the foregoing, that a fluid pressure control valve of the self-lapping type has been provided, wherein the forces required to operate the control pedal are relatively small, due to the balancing of the inlet valve by the element 21 acting as a piston, and wherein the pressure delivered to the actuators is at all times substantially proportional to the degree of movement of the control pedal from release position as well as to the force exerted by the control pedal on the plunger 37 to compress the graduating spring.

Referring now to Fig. 2 of the drawings, wherein a similar control valve of modified form is illustrated, a casing 45 is provided with an inlet chamber 46, an outlet chamber 47, and an exhaust chamber 48 having an exhaust port 49. The inlet chamber is connected with the outlet chamber by means of a bore 50, while the outlet chamber is connected with the exhaust chamber by means of a bore 51, preferably having the same area as the bore 50. A spherical inlet valve 52 provided at its upper end with a piston 53 is slidably mounted in the casing and adapted on upward movement to close the lower end of the bore 50 against the pressure of fluid in the inlet chamber, the valve being normally maintained in closed position by means of a spring 54 interposed between the lower surface of the piston and the casing. The piston is slidably mounted in a bore 55, preferably having the same diameter as the bore 50, and the inlet chamber is provided with an inlet port 56 connected with supply reservoir 4 by means of a conduit 7. The outlet chamber is provided with an outlet port 57 connected with a pair of fluid actuators 8 by means of conduits 9 and 10. The flow of fluid pressure through the bore 51 between the outlet and exhaust chambers is controlled by means of a spherical exhaust valve 58 provided with a stem 59, and the exhaust valve is normally maintained in the open position shown by means of a spring 60 interposed between the casing and a flange 61 formed on the exhaust valve stem, it thus being apparent that closing of the exhaust valve must be effected against the pressure of fluid in the outlet chamber.

A cover member 62 is provided with a bracket 63 having an operating pedal 36 pivotally mounted thereon and adapted to engage a plunger 37 slidably mounted in the casing. A graduating spring 41, of a type similar to that shown in Fig. 1, is interposed between the plunger 37 and the center of a valve operating beam 64 in the outlet chamber. A cover plate 65 for the bore 55 is attached to the casing in the exhaust chamber as shown and provided with a central bore 66 adapted to slidably receive an inlet valve operating plunger 67, the lower end of the plunger engaging the upper end of the piston 53, and the upper end engaging a depression 68 formed on the lower surface of the beam 64. The left end of the beam is provided with a similar depression 69 and engages the upper end of the exhaust valve stem 59. The graduating spring 41 and the exhaust valve spring 60 are so proportioned that with the operating pedal and the inlet valve in the position shown, the exhaust valve is maintained normally in open position. Thus the flow of fluid pressure from the inlet chamber to the outlet chamber is prevented, and the outlet chamber is connected with atmosphere through the port 51, the exhaust chamber 48 and the exhaust port 49.

In the event the operator desires to operate the valve mechanism to supply fluid pressure to the actuators 8, the pedal 36 is depressed, thus causing the plunger 37 to compress the graduating spring. The springs 54 and 60 are so chosen as to permit closing of the exhaust valve before the force exerted on the plunger 67 is sufficient to move the inlet valve to open position, it being noted that the fluid pressure forces acting on the inlet valve in closed position are balanced due to the fact that the bores 50 and 55 have equal areas. Thus, the beam 64 will pivot about the upper end of the plunger 67 during closing of the exhaust valve, and as the graduating spring is further compressed, the beam will pivot about the upper end of the exhaust valve stem 59 and move the plunger 67 downward to open the inlet valve, thus admitting fluid pressure from the inlet chamber to the outlet chamber and thence to the actuator through conduits 9 and 10. Assuming that the graduating spring is compressed a predetermined amount, the pressure in the outlet chamber will increase, and the upward force exerted on the exhaust valve due to this pressure will correspondingly increase. At the same time, the pressure differential across the valve 52 will decrease, and a condition will be reached wherein the force exerted downward on the inlet valve due to the flow of fluid through the bore 50 to the outlet chamber will be insufficient to maintain the valve in closed position against the force exerted by the inlet valve spring 54, whereupon the inlet valve will be moved to closed position, at the same time rocking the beam 64 about the upper end of the stem 59 in order to slightly compress the graduating spring. If the force exerted on the pedal is now reduced, the pressure in the outlet chamber will move the exhaust valve to open position to correspondingly reduce the outlet chamber pressure, and at the same time to rock the beam about the upper end of the plunger 67 to slightly compress the graduating spring. As the pressure decreases in the outlet chamber, the force exerted by the graduating spring will again be sufficient to move the exhaust valve back to closed position against the force exerted by the spring 60 and by the pressure of fluid in the outlet chamber, and both valves will then be closed in order to maintain a pressure in the outlet chamber substantially proportional to the force exerted on the graduating spring 41 by the operation of the operating pedal. With the valves in closed position, and a predetermined pressure established in the outlet chamber, it will be understood that any increase in pressure in the chamber due to leakage of the inlet valve will force the exhaust valve away from the upper end of the bore 51 in order to release the excess pressure to atmosphere through the exhaust chamber 48 and the exhaust port 49.

As heretofore stated, the inlet valve is balanced insofar as the forces exerted by the fluid pressure in the inlet chamber are concerned, and consequently the force required to move the valve to open position under all conditions of operation is relatively small, and the valve mechanism can be operated with a minimum of effort by the operator. The beam 64 insures sequential operation of the inlet and exhaust valves, and in the event the springs 54 and 60 are properly chosen, prevents the possibility of both valves being open at the same time, a condition which would result in excessive and continuous leakage of fluid pressure from the valve mechanism through the exhaust port 49. As in the case of the structure shown in Fig. 1, the inlet valve is balanced insofar as the forces exerted by the pressure of fluid in the inlet chamber are concerned, and both valves are positioned to close against the pressure rather than with the pressure, thus resulting in a construction wherein the operating forces on the pedal are relatively small. At the same time, the pressure in the outlet chamber is at all times substantially proportional to the degree of movement of the pedal from released position, as well as to the degree of force exerted on the pedal by the operator, and the dimensions of the various parts including the inlet and exhaust valve springs, can be so chosen as to insure an accurate and sensitive control of the degree of pressure supplied to the actuators. The valve operating element in Fig. 1, and the piston 53 in Fig. 2 are relatively small, and consequently the entire valve mechanism is extremely compact and of light weight, in view of the fact that relatively large pressure responsive members required in other types of self-lapping control valves are unnecesary when the present type of construction is utilized.

While one embodiment of the invention and a modification thereof have been illustrated and described in considerable detail, it is to be understood that the invention is not limited thereto, but may be capable of being employed in other forms, as will be understood by those skilled in the art. Reference will, therefore, be had to the appended claims for a definition of the limits of the invention.

What is claimed is:

1. In a self-lapping fluid pressure valve mechanism having a casing provided with inlet, outlet and exhaust chambers, a spherical inlet valve for closing communication between the inlet and outlet chambers and mounted in the outlet chamber to open in the direction of flow of fluid from the inlet to the outlet chambers, a spherical exhaust valve for closing communication between the outlet and exhaust chambers and mounted in the exhaust chamber to be opened by pressure in the outlet chamber, a valve operating element connected with the inlet valve and having a part tending to close the inlet valve in opposition to the tendency of the inlet pressure to open the inlet valve, and means to operate said valves including means to move the element and inlet valve connected thereto.

2. In a self-lapping fluid pressure valve mechanism having a casing provided with inlet, outlet and exhaust chambers, a valve operating element slidably mounted in a bore in said casing, said bore being of the same diameter throughout its length and having an inlet valve seat formed at one end and having an intermediate portion connected with said inlet, a spherical exhaust valve for closing communication between the outlet and exhaust chambers and mounted in the exhaust chamber to be opened by pressure in the outlet chamber, a spherical inlet valve connected with said element and cooperating with said seat for closing communication between the inlet and outlet chambers and mounted in the outlet chamber to open in the direction of flow of fluid from the inlet to the outlet chambers, a spring for closing said inlet valve, and means to operate said valves including means to move the element and inlet valve connected thereto.

3. In a self-lapping fluid pressure valve mechanism having a casing provided with inlet, outlet and exhaust chambers, a spherical inlet valve for closing communication between the inlet and outlet chambers and mounted in the outlet chamber to open in the direction of flow of fluid from the inlet to the outlet chambers, a spherical exhaust valve for closing communication between the outlet and exhaust chambers and mounted in the exhaust chamber to be opened by pressure in the outlet chamber, a valve operating element connected with the inlet valve and slidably mounted in a bore in said casing, said bore being of the same diameter throughout its length, said element having a part tending to close the inlet valve in opposition to the tendency of the inlet pressure to open the inlet valve, a spring for closing said inlet valve, and means to operate said valves including means to move the element and inlet valve connected thereto.

4. In a self-lapping fluid pressure valve mechanism having a casing provided with inlet, outlet and exhaust chambers together with a bore having a pair of portions of equal diameter disposed on opposite sides of the inlet chamber and communicating therewith, a valve seat formed at one end of one of said portions, a valve operating element slidably mounted in the other portion, a spherical inlet valve connected with said element and cooperating with said seat to close communication between the inlet and outlet chambers and mounted in the outlet chamber to open in the direction of fluid flow, the effective areas of said element and said valve being equal so that the forces thereon are balanced when the valve is closed, a spherical exhaust valve for closing communication between the outlet and exhaust chambers and mounted in the exhaust chamber to be opened by pressure in the outlet chamber, and means to operate said valves including means to move the element and inlet valve connected thereto.

5. In a self-lapping fluid pressure valve mechanism having a casing provided with inlet, outlet and exhaust chambers, a spherical inlet valve for closing communication between the inlet and outlet chambers and mounted to open in the direction of flow of fluid from the inlet to the outlet chambers, a spherical exhaust valve for closing communication between the outlet and exhaust chambers and mounted to be opened by pressure in the outlet chamber, a valve operating element connected with the inlet valve and having a part tending to close the inlet valve in opposition to the tendency of the inlet pressure to open the inlet valve, said element having a bore for connecting the outlet and exhaust chambers, and means to move the exhaust valve to close said bore and to then move the element to open the inlet valve.

6. In a self-lapping fluid pressure valve mechanism having a casing provided with inlet, outlet and exhaust chambers, a valve operating element slidably mounted in a bore in said casing, said bore being of the same diameter throughout its length and having an inlet valve seat formed at one end, an intermediate portion connected with said inlet, and an exhaust passage for connecting the outlet and exhaust chambers, a spherical exhaust valve for closing said passage and mounted to be opened by pressure in the outlet chamber, a spherical inlet valve connected with said element and cooperating with said seat for closing communication between the inlet and outlet chambers and mounted to open in the direction of flow of fluid from the inlet to the outlet chambers, and means to move the exhaust valve to close said passage and to then move the element to open the inlet valve.

7. In a self-lapping fluid pressure valve mechanism having a casing provided with inlet, outlet and exhaust chambers, a spherical inlet valve for closing communication between the inlet and outlet chambers and mounted to open in the direction of flow of fluid from the inlet to the outlet chambers, a spherical exhaust valve for closing communication between the outlet and exhaust chambers and mounted to be opened by pressure in the outlet chamber, a valve operating element connected with the inlet valve and slidably mounted in a bore in said casing, said bore being of the same diameter throughout its length and having a part tending to close the inlet valve in opposition to the tendency of the inlet pressure to open the inlet valve, said bore being also provided with an exhaust passage for connecting the outlet and exhaust chambers, a spring tending to close the inlet valve, and means to move the exhaust valve to close said passage and to then move the element to open the inlet valve.

8. In a self-lapping fluid pressure valve mechanism having a casing provided with inlet, outlet and exhaust chambers together with a bore having a pair of portions of equal diameter disposed on opposite sides of the inlet chamber and communicating therewith, a valve seat formed at one end of one of said portions, a valve operating element slidably mounted in the other portion, and provided with an exhaust passage for connecting the outlet and exhaust chambers, a spherical inlet valve connected with said element and cooperating with said seat to close communication between the inlet and outlet chambers and mounted to open in the direction of fluid flow, the effective areas of said element and said valve being equal so that the forces thereon are balanced when the valve is closed, a spherical exhaust valve for closing communication between the outlet and exhaust chambers through said passage and mounted to be opened by pressure in the outlet chamber, and means to move the exhaust valve to close said passage and to then move the element to open the inlet valve.

9. In a self-lapping fluid pressure valve mechanism having a casing provided with inlet, outlet and exhaust chambers, a spherical inlet valve for closing communication between the inlet and outlet chambers and mounted to open in the direction of flow of fluid from the inlet so the outlet chamber, a spherical exhaust valve for closing communication between the outlet and exhaust chambers and mounted to be opened by pressure in the outlet chamber, a valve operating element connected with the inlet valve and having a part tending to close the inlet valve in opposition to the tendency of the inlet pressure to open the inlet valve, and means to operate said valves including a rocking beam for first closing the exhaust valve and then moving the element and inlet valve connected thereto to open the inlet valve.

10. In a self-lapping fluid pressure valve mechanism having a casing provided with inlet, outlet and exhaust chambers, a valve operating element slidably mounted in a bore in said casing, said bore being of the same diameter throughout its length and having an inlet valve seat formed at one end and having an intermediate portion connected with said inlet, a spherical exhaust valve for closing communication between the outlet and exhaust chambers and mounted to be opened by pressure in the outlet chamber, a spherical inlet valve connected with said element and cooperating with said seat for closing communication between the inlet and outlet chambers and mounted to open in the direction of flow of fluid from the inlet to the outlet chambers, a spring for closing said inlet valve, and means to operate said valves including a rocking beam for first closing the exhaust valve and then moving the element and inlet valve connected thereto to open the inlet valve.

11. In a self-lapping fluid pressure valve mechanism having a casing provided with inlet, outlet and exhaust chambers, a spherical inlet valve for closing communication between the inlet and outlet chambers and mounted to open in the direction of flow of fluid from the inlet to the outlet chambers, a spherical exhaust valve for closing communication between the outlet and exhaust chambers and mounted to be opened by pressure in the outlet chamber, a valve operating element connected with the inlet valve and slidably mounted in a bore in said casing, said bore being of the same diameter throughout its length and having a part tending to close the inlet valve in opposition to the tendency of the inlet pressure to open the inlet valve, a spring for closing said inlet valve, and means to operate said valves including a rocking beam for first closing the exhaust valve and then moving the element and inlet valve connected thereto to open the inlet valve.

12. In a self-lapping fluid pressure valve mechanism having a casing provided with inlet, outlet and exhaust chambers together with a bore having a pair of portions of equal diameter disposed on opposite sides of the inlet chamber and communicating therewith, a valve seat formed at one end of one of said portions, a valve operating element slidably mounted in the other portion, a spherical inlet valve connected with said element and cooperating with said seat to close communication between the inlet and outlet chambers and mounted to open in the direction of fluid flow, the effective areas of said element and said valve being equal so that the forces thereon are balanced when the valve is closed, a spherical exhaust valve for closing communication between the outlet and exhaust chambers and mounted to be opened by pressure in the outlet chamber, and means to operate said valves including a rocking beam for first closing the exhaust valve and then moving the element and inlet valve connected thereto to open the inlet valve.

13. In a self-lapping fluid pressure valve mechanism having a casing provided with inlet, outlet and exhaust chambers together with a bore having a pair of portions of equal diameter disposed on opposite sides of the inlet chamber and communicating therewith, a valve seat formed at one end of one of said portions, a valve operating element slidably mounted in the other portion, a spherical inlet valve connected with said element and cooperating with said seat to close communication between the inlet and outlet chambers and mounted to open in the direction of fluid flow, the effective areas of said element and said valve being equal so that the forces thereon are balanced when the valve is closed, a spherical exhaust valve for closing communication between the outlet and exhaust chambers and mounted to be opened by pressure in the outlet chamber, a spring normally maintaining the exhaust valve open, a second spring normally maintaining the inlet valve closed, and means to operate said valves including a rocking beam for first closing the exhaust valve and then moving the element and inlet valve connected thereto to open the inlet valve.

ROGER H. CASLER.

REFERENCES CITED

The following references are of record in the file of this patent:

UNITED STATES PATENTS

| Number | Name | Date |
|---|---|---|
| 721,499 | Brennan | Feb. 24, 1903 |
| 1,526,452 | Alder | Feb. 17, 1925 |
| 1,707,742 | Schjolin | Apr. 2, 1929 |
| 2,040,590 | Avery | May 12, 1936 |
| 2,204,530 | Eaton | June 11, 1940 |
| 2,402,317 | Du Bois | Jan. 18, 1946 |

FOREIGN PATENTS

| Number | Country | Date |
|---|---|---|
| 408,011 | Great Britain | Apr. 5, 1934 |